United States Patent
Horton et al.

(10) Patent No.: US 6,340,245 B1
(45) Date of Patent: Jan. 22, 2002

(54) COATED ROLLING ELEMENT BEARING

(75) Inventors: Stuart Alexander Leslie Horton, Zeist; Renier Olga Ernst Vijgen, Vleuten; Robin Thomas Cundill, Nieuwegein, all of (NL); Hans Sjöström, Gotenburg (SE)

(73) Assignee: SKF Engineering & Research Centre B.V., Nieuwegein (NL)

( * ) Notice: Subject to any disclaimer, the term of this patent is extended or adjusted under 35 U.S.C. 154(b) by 0 days.

(21) Appl. No.: 09/486,218

(22) PCT Filed: Sep. 16, 1998

(86) PCT No.: PCT/NL98/00533

§ 371 Date: Apr. 26, 2000

§ 102(e) Date: Apr. 26, 2000

(87) PCT Pub. No.: WO99/14512

PCT Pub. Date: Mar. 25, 1999

(30) Foreign Application Priority Data

Sep. 16, 1997 (NL) .............................. 1007046

(51) Int. Cl.[7] .............................. F16C 33/32
(52) U.S. Cl. ........................ 384/492; 428/216
(58) Field of Search ................ 384/492, 907.1; 428/216, 634, 408, 627, 610

(56) References Cited

U.S. PATENT DOCUMENTS

| | | | |
|---|---|---|---|
| 4,540,636 A | | 9/1985 | Mac Iver et al. |
| 4,842,937 A | * | 6/1989 | Meyer et al. ............ 428/408 X |
| 4,960,643 A | | 10/1990 | Lemelson |
| 5,108,813 A | | 4/1992 | Noda et al. |
| 5,284,394 A | * | 2/1994 | Lemelson ............. 384/907.1 X |
| 5,456,986 A | * | 10/1995 | Majetich et al. ......... 428/408 X |
| 5,466,431 A | * | 11/1995 | Dorfman et al. ......... 428/408 X |
| 5,593,234 A | | 1/1997 | Liston |
| 5,631,761 A | | 5/1997 | Lee |
| 5,718,976 A | * | 2/1998 | Dorfman et al. ......... 428/408 X |
| 5,728,465 A | * | 3/1998 | Dorfman et al. ......... 428/408 X |
| 5,752,773 A | * | 5/1998 | Rosado et al. ......... 384/907.1 X |
| 5,786,068 A | * | 7/1998 | Dorfman et al. ......... 428/408 X |
| 6,020,072 A | * | 2/2000 | Woydt et al. ......... 384/907.1 X |
| 6,080,470 A | * | 6/2000 | Dorfman ..................... 428/216 |

FOREIGN PATENT DOCUMENTS

| | | | | |
|---|---|---|---|---|
| EP | 0438775 A2 | * | 1/1990 | .......... 384/907.1 X |
| EP | 0 438 775 A2 | | 7/1991 | |
| JP | 5-186870 | | 7/1993 | |
| JP | 6-341445 | | 12/1994 | |
| WO | WO 95/12693 | | 5/1995 | |

OTHER PUBLICATIONS

Delplancke–Ogletree, "Wear behavior of diamond–like carbon/metal carbide multilayers", May 1, 1998, Surface & Coatings Technology (108–109), pp. 484–488.*

* cited by examiner

Primary Examiner—David A. Bucci
Assistant Examiner—Colby Hansen
(74) Attorney, Agent, or Firm—Oliff & Berridge, PLC

(57) ABSTRACT

A rolling element bearing, comprises an inner ring, an outer ring and rolling elements which are in rolling contact with the raceways of the inner ring and the outer ring. The rolling elements and/or the raceway (2) of at least one of the rings is coated with a metal-mixed diamond-like carbon layer (8).

18 Claims, 2 Drawing Sheets

COATED ROLLING ELEMENT BEARING

The invention is related to the field of rolling element bearings. Rolling element bearings are applied in various environments. As long as lubrication is guaranteed, their normal design life can generally be obtained without problems.

Under poor or marginal lubrication conditions however, the behaviour of rolling element bearings is less favourable. In such cases, it may prove to be impossible to form a lubricant film, resulting in direct metal-to-metal contact of the rolling elements and the rings, and thus leading to adhesive wear, such as fretting, and premature failure.

Also, rolling element bearings which are exposed to periods of vibratory or oscillatory motions while under static load without rotation of the bearing often show a phenomenon known as "False-Brinelling", which again can limit bearing life.

As a consequence of these phenomena, the service life under poor lubrication conditions is greatly impaired. Attempts have been made to alleviate this problem by applying hard coatings onto the bearing components, e.g. comprising carbide and nitride coatings (e.g. TiN, TiC, CrN), as well as solid lubricants such as molybdenum -di-sulphide.

None of these attempts however has yielded a significant improvement. Although nitride and carbide coatings have high hardness levels and do offer a good abrasive wear resistance and high hardness, their friction coefficients are high. These high friction coefficients in combination with high hardness leads to abrasive wear of the counterface, i.e. of a ring or rolling element.

Furthermore, the high adhesion of TiC, TiN and CrN coatings is only attained with relatively high coating temperatures of the order of 400° C. Such coatings are widely used for cutting tools where the substrate material is made from highly alloyed high speed steel which retains hardness at temperatures of 500 to 540° C., due to the phenomenon of secondary hardening. Such coating temperatures would result in excessive softening and dimensional changes with the lower alloyed steels that are commonly used in rolling element bearings.

According to U.S. Pat. No. 5,108,813, normal diamond-like carbon coatings can be applied in sliding bearings. A diamond-like carbon coating is defined as a layer of amorphous hydrogenated carbon consisting of both sp3 and sp2 hybridised carbon bonds. While in sliding bearings the adhesion of a diamond-like carbon coating to the substrate is sufficient, in rolling element bearings such coatings flake off as a result of the much higher contact stresses in a rolling element bearing.

The object of the invention is therefore to provide a rolling element bearing which has an increased service life under conditions where lubrication is poor or absent. This object is achieved in that the rolling elements and/or the raceway of at least one of the rings is coated with a metal mixed diamond-like carbon coating.

The metal mixed diamond-like carbon coating according to the invention offers both low friction and high wear resistance, even under the high contact stress levels encountered in rolling element bearings (such stresses can be up to 3 or 4 GPa). The diamond-like carbon coating according to the invention, mixed with carbide forming metal atoms is capable of supporting these high contact stress levels without flaking within itself or from the substrate, when the coating structure is optimized to give high adhesion.

Thus, the coating in question is suitable for application for rolling element bearings operating under dry conditions or where lubrication is poor or even absent.

According to the preferred embodiment, the metal mixed diamond-like-carbon coating is formed on a metallic interlayer of Cr, W, Mo, or Al, which is predeposited onto the substrate surface. There should be a gradual transition of the metallic interlayer into the metal mixed coating. The diamond-like carbon coating, applied to the metallic interlayer, also contains one or more metallic carbide forming elements such as W, Mo or Ti.

The metal mixed diamond-like-carbon part of the coating may be composed of alternating parallel layers of predominantly diamond-like-carbon, but containing some metal carbide, and predominantly metal carbide, but containing some diamond-like-carbon, each of the order of 1 to 50 nanometre thickness.

Alternatively, the metal carbide can be in the form of clusters interspersed throughout a layer of diamond-like-carbon Such layers consists of a matrix of predominantly diamond-like carbon with a dispension of particles of metal carbide. Said particles can have a clustered morphology giving regions (clusters) of metal carbide up to 100 nm in extent. The clusters may be composed of carbides of one or more metals.

The thickness of the metal mixed diamond-like-carbon coating can be up to 10 μm. The multi-layer structure of the coating gives rise to reduced residual stresses in the coating and therefore enhanced adhesion compared to conventional single layer diamond-like-carbon coatings with or without a metallic interlayer.

A further important feature of the coating is the possibility to decrease the metallic carbide forming element content towards the surface during the coating process, thereby increasing the diamond like character of the outer layers of the coating. This still results in high adhesion to the substrate but at the same time also allows a significant increase in the surface hardness as the outer layer of the coating is now closer to pure diamond like carbon. In this case, the low friction and increased hardness gives benefits of increased wear resistance, whilst retaining high adhesion necessary for rolling bearing applications.

Also, there can be a gradual increase in graphite content towards the coating surface. This has the benefit of further reducing the friction coefficient. Of course, both a reduction of the metallic carbide forming element, and an increase in the graphite content towards the coating surface can be achieved.

The metal mixed diamond like carbon coating may also contain metallic Ni or possibly Fe as a means of reducing cost of the carbide forming element source material.

Furthermore the metal-mixed diamond-like-carbon coating can be applied at a coating temperature of <240° C., with the high adhesion levels necessary for rolling element bearings. In this respect temperature sensitive low alloy bearing steels in the hardened and tempered condition can be coated in such a way that microstructural or phase changes of the substrate material do not occur, with the result that there are no permanent irreversible size changes of the coated bearing components. This allows assembly of rings and/or rolling elements with standard components and avoids the need of matching in order to obtain the desired bearing precision and internal clearance.

In addition the low coating temperature ensures that the substrate hardness and fatigue properties of temperature sensitive low alloy bearing steels are not impaired and that standard static and dynamic capacity ratings for the bearing still apply. Nevertheless, the coating can also be applied to high alloy steels, such as martensitic stainless steels and high speed steels.

The invention will be explained further with reference to the examples shown in the figures.

FIG. 1 shows a cross-section to the outer layers of the rolling element or raceway of a ring of a rolling element bearing. The full outer part has been indicated in its entirety by reference No. 1, and has been applied to a substrate 2, e.g. bearing steel.

Figure 1:
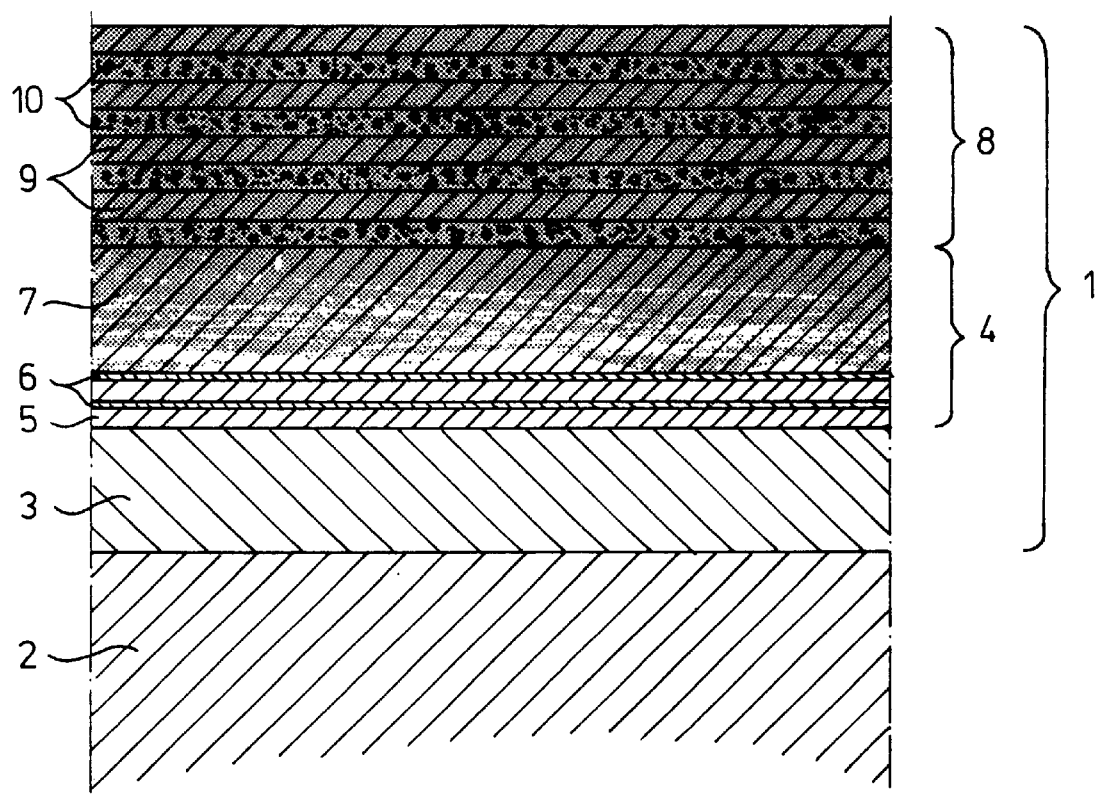
FIG. 1 shows a first embodiment of the invention.

Said full outer part 1 comprises an intermediate metallic interlayer 3, which has been applied directly onto the substrate 2, a transition zone 4 which follows the intermediate metallic interlayer 3, and a metal-mixed diamond-like carbon coating 8. The transition zone 4 comprises an area wherein a multi-layer transition is obtained, with alternating metal-carbide layers 5 and metallic layers 6. Subsequently a smooth transition area 7 is obtained, into the multi-layer structure 8. The transition area 7 provides a smooth transition from metal-carbide to a mixture of metal-carbide and diamond-like carbon. Said multi-layer structure 8 comprises alternating metal carbidelayers 9 and diamond-like carbon layers 10.

Figure 2:
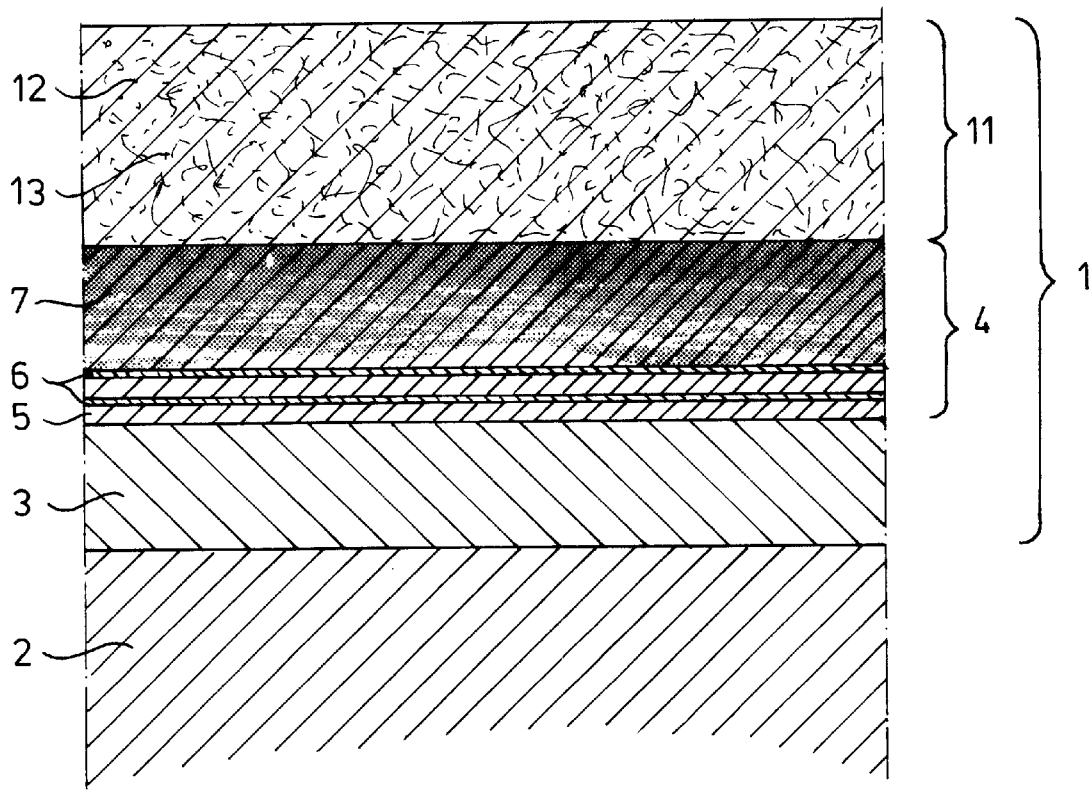
FIG. 2 shows a second embodiment of the invention.

FIG. 2 shows a cross-section to an alternative embodiment, also of the outer layers of a rolling element as the raceway of a ring of a rolling element bearing.

The full coating 11 comprises a matrix 12 of predominantly diamond-like carbon, with a dispersion of metal carbide particles 13. Such particles or clusters 13 of metal carbide may have a maximum dimension of 100 nm.

The substrate 2, interlayer 3 and transition zone 4 are similar to the corresponding ones in the embodiment of FIG. 1.

What is claimed is:

1. A rolling element bearing, comprising an inner ring, an outer ring and rolling elements which are in rolling contact with the raceways of the inner ring and the outer ring, wherein at least one of the rolling elements and the raceway of at least one of the rings is coated with a metal-mixed diamond-like carbon coating comprising alternating layers of predominantly diamond-like carbon, but containing some metal carbide, and layers of predominantly metal carbide, but containing some of the diamond-like carbon.

2. The rolling element bearing according to claim 1, and comprising ancillary components which are in contact with at least one of the rings, and rolling elements and another of said components, wherein at least one of said ancillary components is coated with a metal-mixed diamond-like-carbon coating wherein the metal of the metal-mixed diamond-like carbon is in the form of clusters interspersed throughout a matrix of diamond-like carbon.

3. The rolling element bearing according to claim 2, wherein the ancillary component is a cage.

4. The rolling element bearing according to claim 2, wherein the ancillary component is at least one seal.

5. The rolling element bearing according to claim 2, wherein the ancillary component is at least one shield.

6. The rolling element bearing according to claim 2, wherein the ancillary component is a guide ring.

7. The rolling element bearing according to claim 1 wherein the thickness of the metal-mixed diamond-like-carbon coating is up to 10 μm.

8. The rolling element bearing according to claim 1 wherein the metal-mixed diamond-like-carbon coating is coated onto a metallic intermediate layer.

9. The rolling element bearing according to claim 8, wherein the metal-mixed diamond-like carbon coating is coated onto a metallic intermediate layer of Cr, W, Mho or Al.

10. The rolling element bearing according to claim 8, wherein between the metal-mixed diamond-like-carbon coating and the intermediate metallic layer, there is a transition zone.

11. The rolling element bearing according to claim 1 wherein the metal-containing diamond-like-carbon coating has been applied by coating at a temperature of <240° C.

12. The rolling element bearing according to claim 1 where there is a gradual reduction of the metallic carbide forming element content towards the coating surface such that the outer regions of the coating become more diamond like carbon in nature.

13. The rolling element bearing according to claim 12, wherein the carbide forming element is selected from the group consisting of W, Mo and Ti.

14. The rolling element bearing according to claim 1 wherein there is a gradual increase in graphite content towards the coating surface.

15. The rolling element bearing according to claim 1 wherein the metal-mixed diamond-like-carbon-coating contains Ni.

16. The rolling element bearing according to claim 1 wherein the metal-mixed-diamond-like coating comprises alternating layers of predominately diamond-like-carbon, and layers of predominantly metal carbide.

17. The rolling element bearing according to claim 1 wherein metal is in the form of clusters interspersed throughout a matrix of diamond-like-carbon.

18. The rolling element bearing according to claim 17, wherein the maximum extent of the clusters is 100 nm.

* * * * *